(12) United States Patent
Gerasimov et al.

(10) Patent No.: US 11,261,629 B2
(45) Date of Patent: Mar. 1, 2022

(54) SAFETY LOCKING DEVICE

(71) Applicant: SICK AG, Waldkirch/Breisgau (DE)

(72) Inventors: Pavel Gerasimov, Freiburg (DE);
Stefan Schunke, Freiburg (DE); Julio
Sandino Tagaro Plariza, Talisay (PH)

(73) Assignee: SICK AG, Waldkirch (DE)

( * ) Notice: Subject to any disclaimer, the term of this
patent is extended or adjusted under 35
U.S.C. 154(b) by 548 days.

(21) Appl. No.: 16/214,524

(22) Filed: Dec. 10, 2018

(65) Prior Publication Data
US 2019/0178014 A1 Jun. 13, 2019

(30) Foreign Application Priority Data

Dec. 13, 2017 (EP) ..................................... 17206982

(51) Int. Cl.
E05C 19/04 (2006.01)
F16P 3/08 (2006.01)
E05B 15/02 (2006.01)
E05B 47/02 (2006.01)
E05B 17/22 (2006.01)
E05B 47/00 (2006.01)

(52) U.S. Cl.
CPC .......... *E05C 19/04* (2013.01); *E05B 15/0205*
(2013.01); *E05B 47/026* (2013.01); *F16P 3/08*
(2013.01); *E05B 17/226* (2013.01); *E05B
2015/023* (2013.01); *E05B 2047/0086*
(2013.01); *E05Y 2900/608* (2013.01)

(58) Field of Classification Search
CPC .... E05C 19/04; E05C 19/002; E05B 15/0205;
E05B 47/026; E05B 17/226; E05B
2015/023; E05B 2047/0086; E05B
2015/0265; F16P 3/08; E05Y 2900/608

USPC .......................................................... 292/252
See application file for complete search history.

(56) References Cited

U.S. PATENT DOCUMENTS

| 4,121,319 A | 10/1978 | Anthony et al. |
| 5,690,373 A * | 11/1997 | Luker ................. E05B 63/0065 292/201 |
| 8,944,478 B2 | 2/2015 | Pullmann et al. |
| 9,611,679 B2 * | 4/2017 | Wollacott ............ E05B 15/0006 |
| 9,890,571 B1 * | 2/2018 | Marsden ................. E05C 17/36 |
| 2013/0020817 A1 | 1/2013 | Pullmann et al. |

(Continued)

FOREIGN PATENT DOCUMENTS

| DE | 1648898 U | 12/1952 |
| DE | 67888 A1 | 7/1969 |

(Continued)

*Primary Examiner* — Kristina R Fulton
*Assistant Examiner* — James Edward Ignaczewski
(74) *Attorney, Agent, or Firm* — Nath, Goldberg &
Meyer; Jerald L. Meyer

(57) ABSTRACT

The present invention relates to a safety locking device for interlocking a safety door, having a movable part designed for being fastened to a moving part of the safety door and having a locking element, and a stationary part designed for being fastened to a non-moving part of the safety door. The stationary part includes a receiving section having an opening for the reception of the locking element, where the locking element can be inserted into the receiving section from different insertion directions when the locking element is aligned in the insertion direction. The stationary part includes a latch selectively movable from a locking position into a release position.

22 Claims, 7 Drawing Sheets

(56) References Cited

U.S. PATENT DOCUMENTS

| | | | | |
|---|---|---|---|---|
| 2015/0040348 A1* | 2/2015 | Header | .................. | E05C 17/46 |
| | | | | 16/82 |
| 2018/0202205 A1* | 7/2018 | Pychtin | ............... | E05B 63/0056 |
| 2020/0182403 A1* | 6/2020 | Plariza | .................... | G05B 9/02 |

FOREIGN PATENT DOCUMENTS

| | | | | | |
|---|---|---|---|---|---|
| DE | 19911275 | A1 * | 4/2000 | ............ | E05C 19/04 |
| DE | 19911275 | A1 | 4/2000 | | |
| DE | 10230564 | A1 | 1/2004 | | |
| DE | 102004030124 | A1 | 9/2005 | | |
| DE | 202017100157 | U1 | 12/2017 | | |
| EP | 1314840 | A2 | 5/2003 | | |
| EP | 2463460 | A2 * | 6/2012 | ............. | E05C 17/52 |

\* cited by examiner

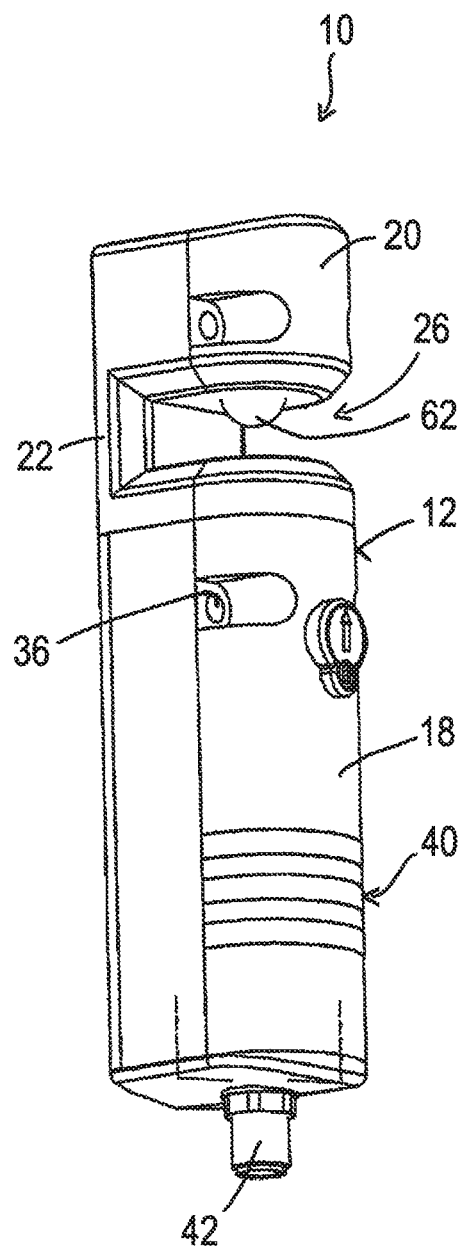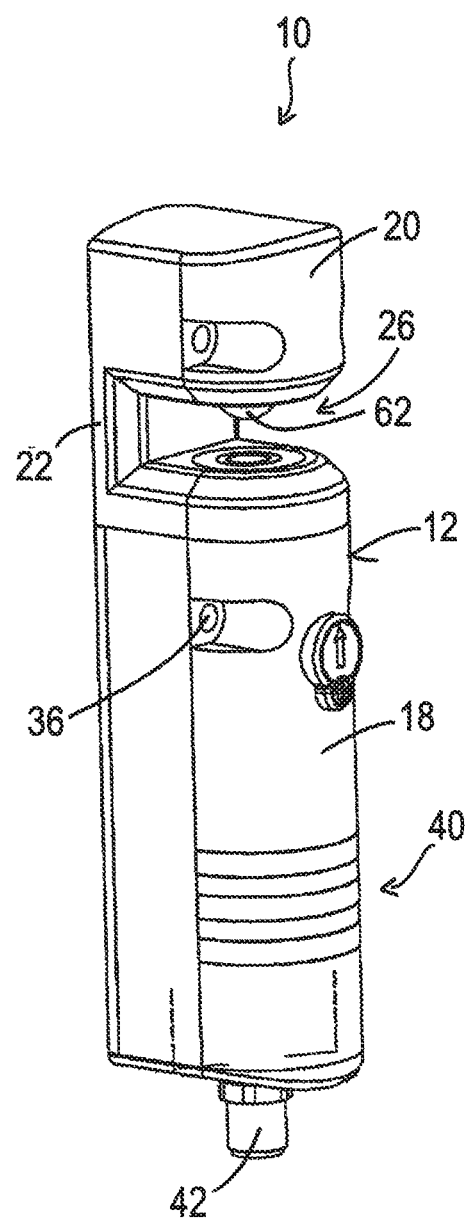
Fig. 9A
Fig. 9B

SAFETY LOCKING DEVICE

The present invention relates to a safety locking device for interlocking a safety door. The safety locking device of the invention has a movable part designed for being fastened to a moving part of the safety door; the movable part has a locking element. The safety locking device further comprises a stationary part designed for being fastened to a non-moving part of the safety door. The stationary part comprises a receiving section; the receiving section comprises an opening for the reception of the locking element, wherein the locking element can be inserted into the receiving section through the opening from different insertion directions, preferably when the locking element is aligned in the insertion direction. The stationary part further comprises a latch, the latch being selectively movable from a locking position into a release position, wherein the locking element is secured in the receiving section when the latch is in the locking position and wherein the locking element can be withdrawn from the receiving section when the latch is in the released position.

Such safety locking devices are usually used in two kinds of applications. Firstly, safety locking devices are used for people protection, i.e. at machine doors that need to be locked as long as danger from a machine is present. For example, a machine might pose a danger due to movements of the machine, heat or radiation. Secondly, safety locking devices can be used in process protection, i.e. in this case machine doors need to be interlocked to protect the process performed by the machine. For example, a process may be damaged if a door is opened at the wrong time. This is particularly true for soldering, gluing and/or packaging processes.

Usually, a safety locking device comprises a safety switch or sensor that may be mounted on a fixed part of the machine, e.g. a door frame. Hereinafter, the safety switch will be referred to as "stationary part". The safety locking device further comprises an actuator that is e.g. mounted on the movable safety door. In the following, the actuator will be referred to as "movable part".

In operation of the safety locking device, when the door is closed, the movable part is inserted into the receiving section of the stationary part and can be secured in the receiving section by means of the latch (e.g. by a locking pin, as explained later), after a lock command is received.

Due to the large variety of safety doors, two challenges have to be approached by the safety locking device. Firstly, the safety locking device has to be suitable for different doors (e.g. swing doors, sliding doors, hoods, etc.). Secondly, the safety locking device has to be able to compensate misalignments of the safety door.

It is the object of the present invention to provide a safety locking device that can be used in conjunction with different types of safety doors and preferably provides compensation mechanisms for misalignment of the door.

This object is solved by a safety locking device having the features of claim 1.

Particularly, this object is satisfied by a safety locking device that is characterized in that the locking element is (or may be) secured in the locking position aligned in one of a plurality of locking directions, wherein the different locking directions comprise directions which together form a continuous angular range of at least 90°.

In other words, the safety locking device of the invention allows the locking element of the movable part to be secured in the receiving section in differently aligned positions (i.e. in one direction out of a plurality of locking directions).

These differently aligned positions form a continuous angular range of at least 90°. This means that within the continuous angular range of at least 90°, it does not matter in which direction within the continuous angular range the locking element is aligned in the receiving section, the locking element can always be secured by the latch and therefore can guarantee that the safety door remains closed.

The locking direction preferably is the direction in which the locking element predominantly extends when it is inserted and/or secured in the receiving section. The insertion direction preferably is the direction in which the locking element is inserted into the receiving section.

Particularly, the locking direction and the insertion direction can be identical. In this case, the possible locking directions and the possible insertion directions comprise the same continuous angular range of at least 90°. Alternatively, the locking direction and the insertion direction can be different and may e.g. be perpendicular. For example, when the movable part is fastened to a wing of a sliding safety door, the locking element can protrude in a direction perpendicular to a plane defined by the wing of the door. When the sliding door moves to a closed position, the locking element is "sideways" inserted into the receiving section and then secured in the receiving section. In this case, the insertion direction and the locking direction are perpendicular to each other, as the locking direction is perpendicular to the plane defined by the wing of the door.

Due to the different insertion directions which are possible, the safety locking device of the invention can be used with different types of safety doors and therefore allows a flexible use of the inventive safety locking device. Similar to the locking directions, the possible insertion directions may comprise directions which form a continuous angular range of at least 90° and preferably of at least 180°. The continuous angular ranges of the locking directions and of the insertion directions may be identical.

In the secured state, i.e. when the latch is in the locking position and secures the locking element in the receiving section, the locking element may be arranged within the continuous angular range of at least 90°. In the secured state, the locking element may even pivot around the latch preferably within the continuous angular range.

Due to the angular range of at least 90°, the safety locking device can be used e.g. for a sliding door, in which case the locking element would be introduced "sideways" into the receiving section. On the other hand, also a swing door would be possible, in which case the locking element would be introduced into the receiving section from "the front".

As used herein, the term "safety door" may include flaps, covers, hoods, and in particular also the already mentioned sliding doors and pivoting/swing doors. In general, "safety door" can be understood as elements which are used to enable access to a machine or a system, which are closed in a secure and monitored manner during the operation of said machine or system.

Preferably, the different locking directions comprise directions which together form a continuous angular range of at least 180°. In principle, even more than 180° are possible, e.g. 200° or 270°. The continuous angular range of at least 180° allows the locking element to be inserted and secured in the receiving section from "both sides" of the stationary part. This allows for an even more flexible use of the safety locking device. The same angular ranges are possible for the insertion directions.

Further preferably, as mentioned above, the different insertion directions may comprise directions which together form a continuous angular range of at least 90° or 180°.

Thereby, the movable part can also be inserted into the stationary part in any direction within the continuous angular range.

Advantageously, the receiving section and/or the opening are formed between a main piece of the stationary part and a counter piece of the stationary part, wherein the receiving section is preferably bordered by two parallel walls, a first wall being of the main piece and the second wall being of the counter piece. The receiving section can extend between the first wall and the second wall. In other words, a housing of the stationary part may form a recess that defines the receiving section. The recess divides the housing of the stationary part into the main piece and the counter piece. The main piece and the counter piece may be connected via a connection section, wherein the connection section can form a plain back wall that borders the receiving section.

The receiving section may only be bordered by the first and second wall and by the back wall. Between the back wall and both, the first and second wall, an angle of 90° may be present. Thereby, a large continuous opening is formed which circumscribes the receiving section. The receiving section is also defined by the first and second wall and by the back wall. Due to the large continuous opening the insertion and locking of the locking element from different insertion directions and in different locking directions is made possible, thus leading to a safety locking device which can be flexibly used with different types of safety doors.

The stationary part may comprise chamfered edges which delimit the receiving section. Due to the chamfered edges, the locking element is guided into the receiving section, even if the locking element is slightly misaligned or wrongly positioned.

The main piece and/or the counter piece may have mounting holes for mounting the stationary part to an e.g. door frame. If mounting holes are provided at the main piece and at the counter piece, a high mechanical stability can be achieved which results in strong forces that the safety locking device can withstand.

Preferably, the opening comprises a continuous angular range around the latch of at least 180°. This means, the opening comprises a continuous opening, wherein the opening defines the continuous angular range of at least 180°. The opening thus is not interrupted by elements of the housing or other structural elements which would impede the locking element to be inserted. This large opening allows the locking element to be inserted from any direction within the 180° angular range and thereby provides the large flexibility of usage of the safety locking device.

Further preferably, the latch is rotationally symmetric and preferably comprises at least partly the form of a cylinder. The latch could therefore also be termed as a locking pin. Advantageously, an end region of the latch is spherical or ball-shaped. Due to the symmetric latch it is possible to insert the locking element from different directions and to secure the locking element using the latch, independent of the insertion direction and/or the locking direction. Particularly, the end of the cylinder can have the spherical shape or the ball shape. In other words, the end of the latch can be formed spherical or ball-shaped, wherein the ball-shape then transitions into a cylindrical part of the latch. The cylindrical part of the latch can define a longitudinal axis around which the latch can be rotationally symmetric. Preferably, the insertion directions and/or the locking directions which form the continuous angular range are perpendicular to the longitudinal axis of the latch.

Advantageously, in the release position, the latch protrudes into the receiving section. Particularly, the spherical part of the latch protrudes into the receiving section. The spherical part can protrude from the first wall of the main piece, preferably in a direction perpendicular to a plane defined by the first wall.

Further advantageously, the latch is spring-loaded in the released position. Due to the spring-loaded latch the part of the latch that protrudes into the receiving section in the release position can be pushed back by the locking element, when the locking element is inserted into the receiving section. The spring-loaded latch can be pushed back into the first wall of the main piece. Due to the force of the spring-loaded latch, the locking element can be provisionally secured (i.e. caught) when the locking element is in the receiving section. The latch can therefore perform two operations, namely catching the locking element and locking/securing the locking element.

It is preferred if the stationary part at least partly has a half-circular cross section in a top view. The half-circular cross section can be attached to a rectangular cross section. In a cross-sectional view, preferably in a top view, the position of the center of the half-circular cross section may coincide with the position of the latch.

Thereby, the longitudinal axis may form the center of the half-circular cross section. Due to the half-circular cross section, the movable part can approach the stationary part in any direction within the continuous angular range of 180° without abutting against a housing of the stationary part when the locking element is inserted into the receiving section. The half-circular cross section thereby contributes to the ability to flexibly use the safety locking device for different application scenarios.

Preferably, the locking element protrudes from a holding element of the movable part, the holding element being adapted to be fastened to the moving part of the safety door, wherein the locking element preferably is tongue-shaped. The holding element of the movable part can comprise mounting holes for mounting the movable part e.g. to a door wing of the safety door. For example, screws can be inserted into the mounting holes and can provide a secure fastening of the movable part to the door wing.

From the holding element the locking element may protrude, wherein the locking element can have a rectangular contour in a top view (i.e. tongue-shaped), wherein the locking element may be smaller and/or thinner than the holding element. Due to the thin locking element, also the receiving section can be smaller/thinner, too. This can lead to a compact safety locking device.

Further preferably, an elastic element connects the locking element and the holding element, allowing the locking element to pivot with respect to the holding element. The elastic element may comprise a plastic material, an elastomer and/or a rubber material. The elastic element may additionally comprise a spiral spring. When inserting the locking element in the receiving section, the locking element might be deviated by a housing of the stationary part (e.g. by the chamfered edges). Such a deviation can then lead to a deformation of the elastic element and allows misalignments between the movable part and the stationary part to be compensated. Thereby, the tolerances that have to be maintained when the safety locking device is installed at a safety door can be increased. Also, misalignment tolerances of the safety door can be increased.

Advantageously, the locking element comprises a through-hole, wherein in the locking position the latch at least partly protrudes into or through the through-hole. In other words, the locking element is secured within the receiving section, e.g. by extending the latch through the through-hole of the locking element. The size of the receiving section preferably is adapted to the size of the locking element. For example, the distance between the first and the second wall can be adapted to the thickness of the locking element, wherein the distance between the first and the second wall and the thickness of the locking element may be approximately equal.

Preferably, the through-hole is a circular hole. Alternatively, a slotted hole is also possible. A slotted hole allows for an insertion of the locking element into the receiving section with higher tolerances, as the latch can extend through the through-hole at different positions.

It goes without saying that instead of a through-hole also a recess, a groove, a notch or any other suitable component in the locking element can be used for interaction between the latch and the locking element.

The latch can extend through the first wall of the main piece, through the through-hole and through the second wall of the counter piece. By completely extending the latch through the locking element, the locking element is secured against unwanted removal of the locking element from the receiving section. Thereby, the safety door cannot be opened anymore, as the locking element cannot be removed from the receiving section.

Within the counter piece of the stationary part, a through-bore may be provided in which the latch is guided in the locking position. Thereby, the latch can be rigidly mounted within the main piece and within the counter piece. This can further increase the forces that the latch can withstand. In turn, the safety locking device can provide an increased safety against unwanted opening of the safety door.

The aforementioned locking direction can be defined as the direction from the through-hole of the locking element to the connection of the locking element with the holding element.

In addition to the latch, the stationary part can comprise a catch which is adapted to provisionally secure (i.e. catch) the locking element when the locking element is in the receiving section. The catch preferably protrudes into the receiving section, wherein the catch may protrude from the second wall of the counter piece (i.e. from the "top"). In other words, the catch may protrude into the receiving section from a direction opposite to a direction in which the latch protrudes into the receiving section.

Particularly, after insertion of the locking element into the receiving section, the catch can be guided into the through-hole of the locking element and provisionally secure the locking element in the receiving section. Then the latch can also be moved into the through-hole of the locking element, thereby securing the locking element against unwanted removal from the receiving section.

The latch and the catch can both be movable and/or be arranged along the longitudinal axis. Similar to the latch, an end region of the catch may be spherical or ball-shaped. Due to the thus rotational symmetric catch it is possible to insert the locking element from different directions and to provisionally secure the locking element using the catch, independent of the insertion direction. After provisionally securing the locking element, the locking element can pivot around the catch, e.g. to be moved into a desired locking direction.

The catch can be spring loaded. Thereby, the catch can snap into the through-hole of the locking element. Preferably, the force exerted on the catch by a spring can be adjustable, particularly by means of a screw or other suitable means. Due to the adjustable force, the strength of the provisional securing of the locking element can be adjusted. For example, the screw and/or the catch can reach into the through-bore of the counter piece.

After provisionally securing the locking element, the locking element can be secured in the receiving section by the latch. The latch can be moved into the through-hole of the locking element. The latch can abut against the catch (e.g. within the through-hole). Particularly when used together with the catch, the latch can comprise a cylindrical form having a flat end face, or a concave end face which is adapted to the form of the catch.

It is preferred if the locking element comprises guiding means for interaction with the latch, particularly funnel-like trenches and/or C-shaped outer walls. The funnel-like trenches can spread out from the through-hole of the locking element. Thereby, the trenches can guide the latch (which protrudes into the receiving section), to the through-hole of the locking element. The ball shape of the catch or latch combined with the guiding means of the locking element can help centering and guiding the locking element to achieve the correct final position in the receiving section. Similarly, the C-shaped outer walls (i.e. walls which are parallel to the longitudinal axis of the latch) also have the effect that the protruding part of the latch centers the locking element and guides the locking element to a position in which the latch can protrude into or through the through-hole. The C-shape may be effected by means of a rounded or circular recess.

The funnel-like trenches may be formed on two opposing sides of the locking element. Each trench can extend away from the through-hole, wherein each trench widens with increasing distance to the through-hole. The trenches of each of the opposing sides (upper side and bottom side) extend in directions which each differ by about 90°. Preferably, three trenches on each side are provided. The trenches are bordered by guiding walls which also extend from the through-hole.

Advantageously, the locking element comprises a transponder, preferably an RFID chip (Radio Frequency Identification), and the stationary part comprises a reading device for detecting the transponder, particularly an RFID reader. The safety locking device can be adapted to output an enabling signal once the latch is in the locking position and the transponder has been successfully detected by the reading device. Thereby, a manipulation of the safety locking device can be prevented, as only the "correct" locking element or movable part will enable the stationary part of the safety locking device to lock/secure the locking element, e.g. by moving the latch through the through-hole of the locking element. It is possible that only in this state, i.e. when the latch is locking/securing the locking element an enabling signal may be transmitted, which, on reception at a control unit of a machine, will allow the control unit to start the machine.

Further advantageously, the safety locking device can be electrically controlled. Particularly, the latch can be displaced by means of an electrical actor. For example, the electrical actor can be a solenoid magnet which can be realized as a lifting magnet. Of course, other types of drives can be used, such as electro-motors, in particular (but not necessarily only) linear motors, piezo-resistive or magnetoresistive drives.

Advantageously, a safety spring which is coupled to the latch is provided. The safety spring can push the latch in the direction of the locking position. The safety spring may enable automatic locking, wherein the locking position can be reached without the electrical actor being activated. For this purpose, the safety spring can be activated when the protruding part of the latch is temporarily pushed back into the first wall. In response to pushing the latch back, the safety spring can then move the latch in the locking position. Alternatively, the safety locking device can be configured such that the safety locking device is in the release position when the electrical actor is not operated.

In order to provide electrical energy to the stationary part, the stationary part can comprise an electrical connector. Via the electrical connector, also status signals can be transmitted, e.g. the enabling signal or a signal that prompts the safety locking device to transition from the release position into the locking position (or vice versa).

Furthermore, the stationary part can comprise a manual release. The manual release can comprise a lock that is operated with a key. When operating the manual release, the latch can be moved from the locking position into the release position thereby allowing to withdraw the locking element from the receiving section (e.g. in emergency situations).

The stationary part can also comprise one or more status-LEDs which e.g. show if the stationary part is in the release position or in the locking position.

The invention further relates to a safety locking system. The safety locking system comprises a safety locking device as described above. The safety locking system further comprises a safety door having a movable wing and a stationary frame. The stationary part of the safety locking device is fastened to the frame and the movable part of the safety locking device is fastened to the wing of the safety door. The locking element of the movable part is inserted into the receiving section of the stationary part when the safety door is closed.

The advantages, preferable features and/or embodiments of the inventive safety locking device described in the foregoing also apply to the inventive safety locking system.

During operation of the safety locking system, the stationary part is first in the release position, i.e. the latch slightly protrudes into the receiving section. When the wing of the safety door is closed, the movable part of the safety locking device approaches the stationary part and is then inserted into the receiving section in the insertion direction. During insertion of the locking element of the movable part, the guide trenches of the locking element pivot the locking element relative to the holding element such that the protruding part of the latch is guided into the through-hole of the locking element. The pivoting is allowed by the elastic element connecting the locking element and the holding element of the movable part. After the stationary part has detected (e.g. by means of detecting the transponder with the reading device) that the locking element has been inserted into the receiving section, the electric actor is activated and moves the latch from the release position into the locking position. Thereby, the latch is moved into or through the through-hole of the locking element resulting in securing the locking element in the locking direction. Once the latch has moved into or even through the through-hole of the locking element, an enabling signal is transmitted via the electrical connector of the stationary part and a machine secured by the safety door can commence its operation.

The invention will be explained in the following in detail by means of exemplary embodiments and with reference to the Figures:

FIGS. 9A and 9B shows a fourth embodiment of a safety locking device in two different perspective views (FIG. 9A and FIG. 9B)

Figure 1:
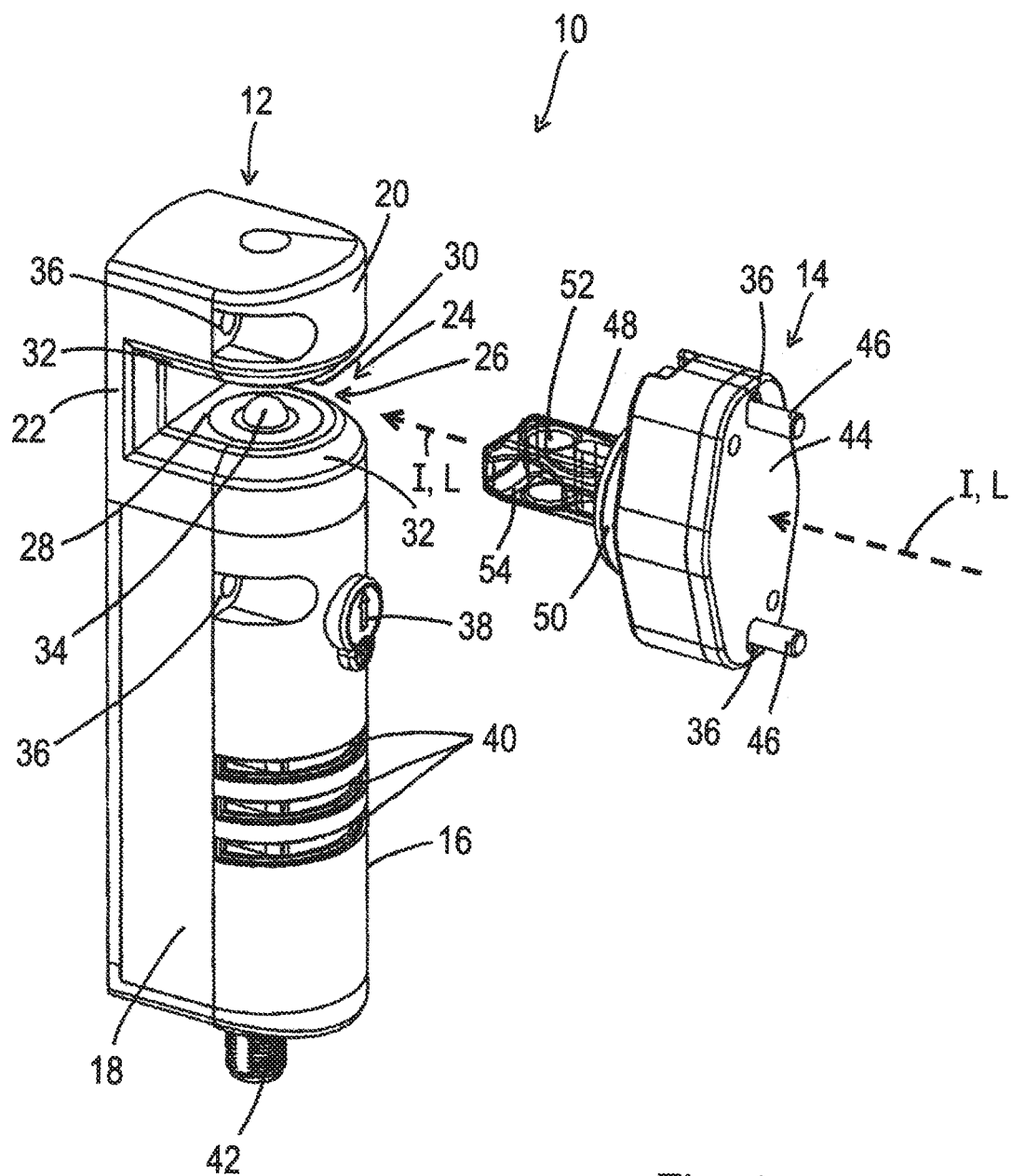
FIG. 1 shows a perspective view of a first embodiment of a safety locking device.

FIG. 1 shows a first embodiment of a safety locking device 10. The safety locking device comprises a stationary part 12 and a movable part 14. The stationary part 12 is fastened to a frame of a safety door (not shown), whereas the movable part 14 is fastened to a pivoting door wing of the safety door (not shown).

The stationary part 12 comprises a housing 16 which comprises a half-circle outer contour. The stationary part 12 comprises a main piece 18 and a counter piece 20. The main piece 18 and the counter piece 20 are connected via a connection section 22.

Between the main piece 18 and the counter piece 20 an opening 24 is defined, wherein between the main piece 18, the counter piece 20 and within the opening 24 a receiving section 26 is formed. The receiving section 26 is bordered by a first wall 28 of the main piece 18 and a second wall 30 of the counter piece 20. The first wall 28 and the second wall 30 each transition into a chamfered edge 32.

From the first wall 28 a latch 34 protrudes into the receiving section 26, wherein a ball-shaped part of the latch 34 protrudes into the receiving section 26.

Both the main piece 18 and the counter piece 20 comprise a pair of mounting holes 36 (only one of each pair is visible in FIG. 1).

The main piece 18 further comprises a manual release 38 which can be operated using a key or a special key (both not shown). Below the manual release 38, the main piece 18 comprises three status-LEDs 40 which indicate an operation status of the safety locking device 10.

At an end opposite to the counter piece 20, the main piece 18 comprises an electrical connector 42 for the transmission of electrical energy to the stationary part 12 and for the control of the safety locking device 10.

The movable part 14 comprises a holding element 44, which comprises two mounting holes 36. Through the mounting holes 36 to screws 46 extend such that the movable part 14 can be attached to the door wing using the screws 46.

From the holding element 44 a locking element 48 extends, wherein the locking element 48 is connected to the holding element 44 via an elastic element 50. The locking element 48 is formed tongue-like and comprises an approximately rectangular square section. The locking element 48 is thinner than the holding element 44. Through the locking element 48 a circular through-hole 52 extends, wherein the diameter of the through-hole 52 is adapted to or corresponds to the diameter of the latch 34.

The two arrows depicted in FIG. 1 indicate an insertion direction I in which the locking element 48 is inserted into the receiving section 26. Once the locking element 48 is secured in the receiving section 26, i.e. when the latch 34 extends through the through-hole 52, then the alignment of the locking element 48 will still be in the same direction as depicted in FIG. 1. Consequently, a locking direction L is (in FIG. 1) identical to the insertion direction I.

Figure 2:
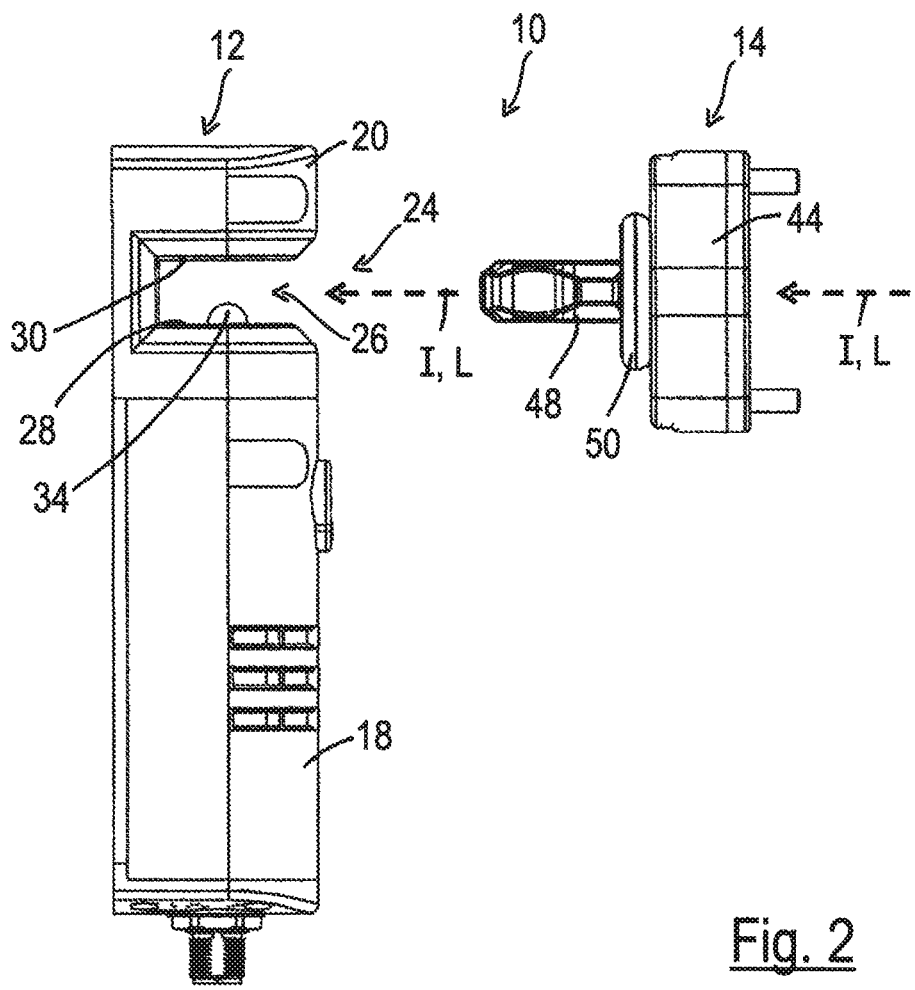
FIG. 2 shows the safety locking device of FIG. 1 in a side view.
Figure 3:
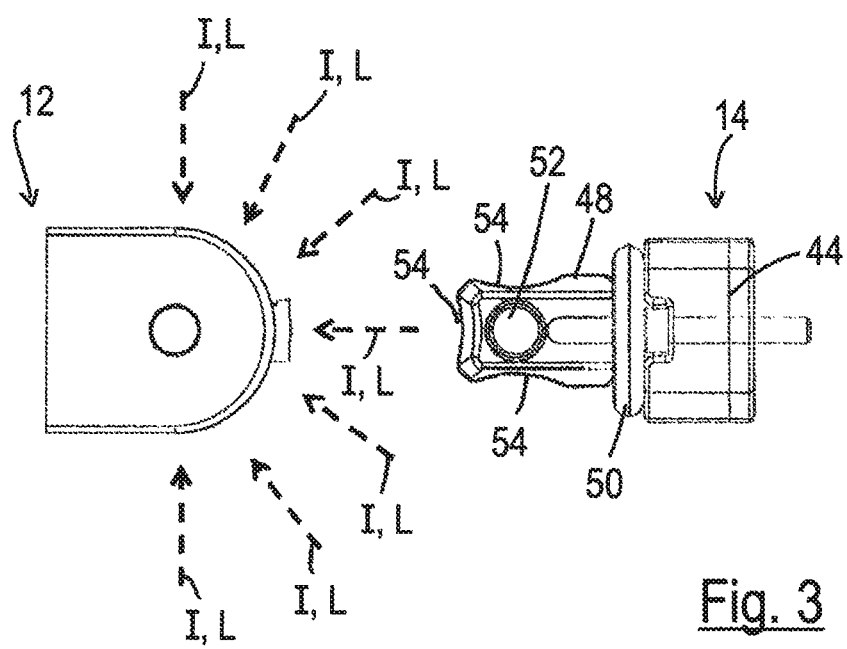
FIG. 3 shows the safety locking device of FIG. 1 in a top view.

FIG. 2 and FIG. 3 show the safety locking device of FIG. 1 in a side view and in a top view, respectively. It is apparent from FIG. 3 that the locking element 48 comprises three outer walls that each comprise a C-shape 54. The C-shapes 54 can interact with the latch 34 and center the locking element 48 with respect to the latch 34 when the locking element 48 is introduced into the receiving section 26. The C-shapes 54 therefore provide that the latch 34 can be reliably introduced into the through-hole 52 of the locking element 48.

In FIG. 3 different possible insertion directions I are shown. The insertion directions I at the same time are also locking directions L. In other words, the locking element 48 can be introduced in the shown insertion directions I and can also be secured in the stationary part 12 in the same direction, i.e. in the corresponding locking direction L. As is apparent, the insertion directions I and the locking directions L both comprise a continuous angular range of at least 180°.

Figures 4A, 4B:
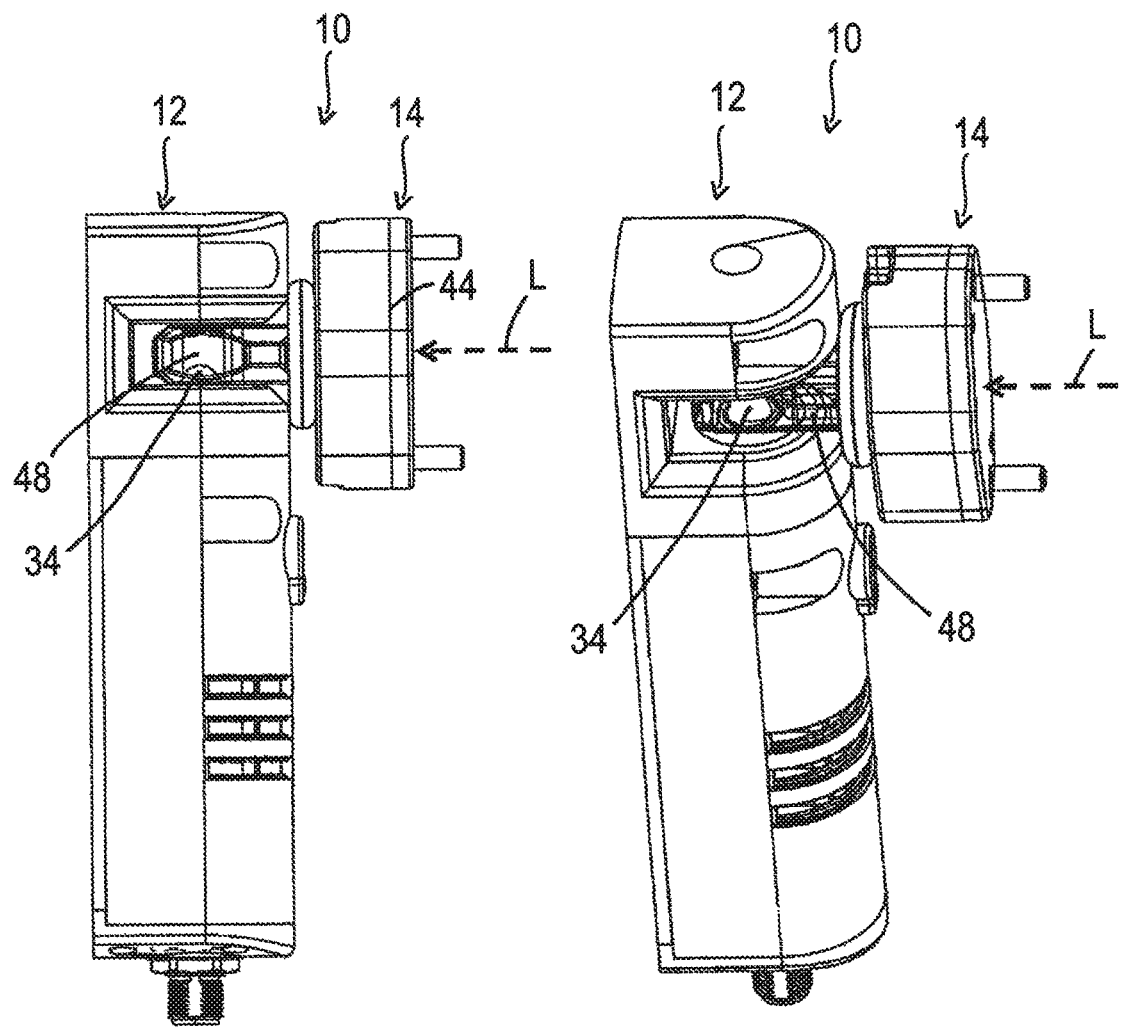
FIG. 4A and FIG. 4B shows the safety locking device of FIG. 1 with the movable part secured in the stationary part in a side view (FIG. 4A) and in a perspective view (FIG. 4B)

FIG. 4A and FIG. 4B show the safety locking device 10 of FIG. 1 in a state in which the locking element 48 is secured in the receiving section 26. In FIGS. 4A and 4B, the latch 34 partially protrudes into the through-hole 52. Alternatively, the latch 34 could also fully extend through the through-hole 52. The corresponding locking directions L are shown.

Figures 5A, 5B:
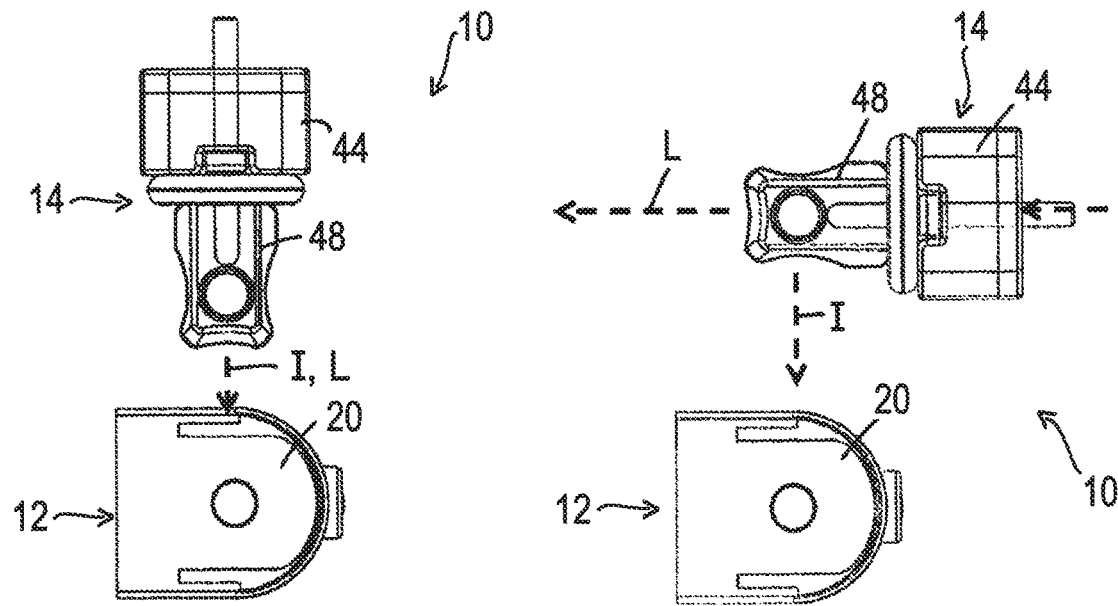
FIGS. 5A, 5B and 5C shows three different directions for inserting the locking element into the stationary part in a top view.
Figure 5C:
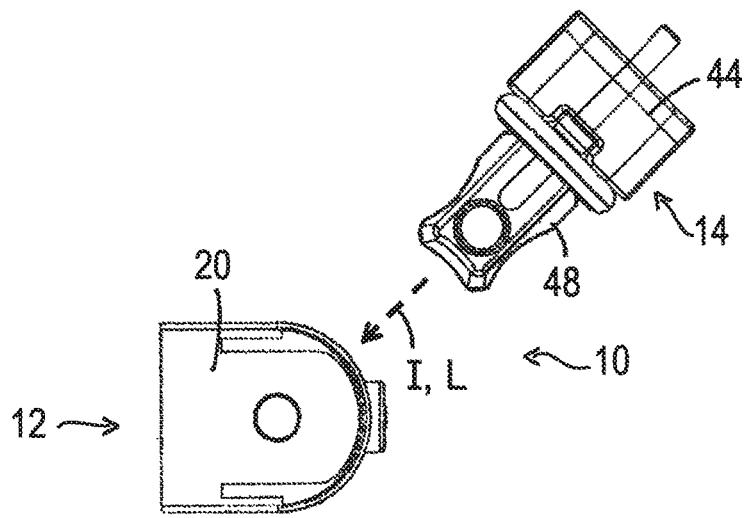

FIGS. 5A, 5B and 5C show different possible insertion directions I in a top view. As compared to FIG. 3 the insertion direction I of FIG. 5A and FIG. 5B has been rotated by 90°. In FIG. 5C the insertion direction I has been rotated by 45°. It has to be noted that in FIG. 5A and FIG. 5C the insertion direction I and the locking direction L are identical. However, FIG. 5B shows a "sideways" insertion of the locking element 48 into the receiving section 26. In FIG. 5B the insertion direction I and the locking direction L are perpendicular to each other.

Figure 6:
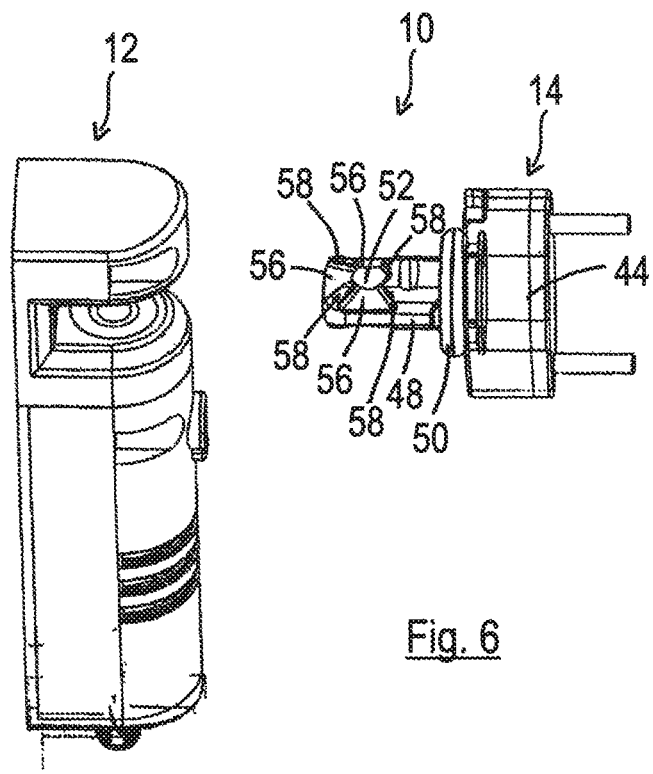
FIG. 6 shows a second embodiment of a safety locking device in a perspective view.

FIG. 6 shows a second embodiment of the safety locking device 10. The second embodiment differs from the first embodiment in that the locking element 48 does not comprise C-shapes 54. Instead, the locking element 48 comprises three trenches 56 on its upper side and on its bottom side. Each trench 56 is formed funnel-like and extends away from the through-hole 52, wherein each trench 56 widens with increasing distance to the through-hole 52. The three trenches 56 of each side (upper side and bottom side) extend in directions which each differ by about 90°. The trenches 56 are bordered by guiding walls 58 which also extend from the through-hole 52.

Alternatively to an embodiment of the locking element 48 comprising either C-shapes 54 or trenches 56, also a combination of C-shapes 54 and trenches 56 is possible.

Figure 7:
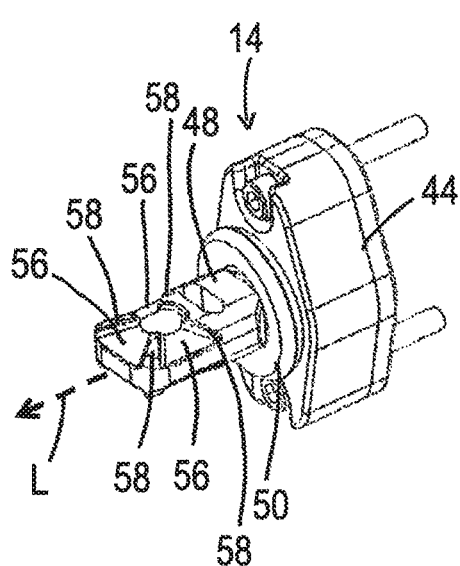
FIG. 7 shows the movable part of the second embodiment in more detail in a perspective view.

The movable part 14 and its locking element 48 are shown in more detail in FIG. 7.

Figure 8:
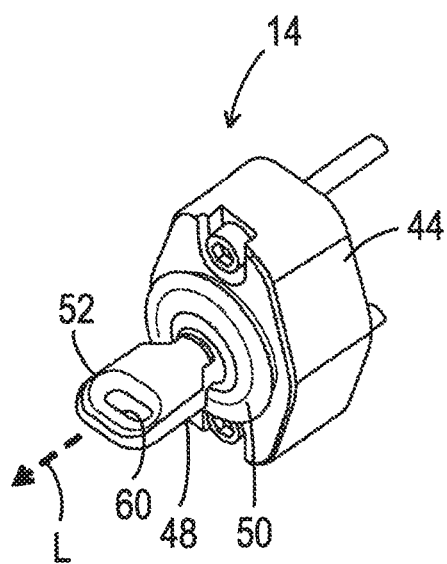
FIG. 8 shows the movable part of a third embodiment of a safety locking device in a perspective view.

A third embodiment is shown in FIG. 8, wherein only the movable part 14 is depicted. The third embodiment differs from the first embodiment in that the locking element 48 does not comprise C-shapes 54. Also, the locking element 48 comprises a through-hole 52 in the form of a slotted hole 60. The slotted hole 60 is formed in a direction perpendicular to the locking direction L. Alternatively, a slotted hole 60 which is formed parallel to the locking direction L would be possible.

FIGS. 9A and 9B show a fourth embodiment of a safety locking device 10, wherein only the stationary part 12 is depicted. The stationary part 12 of the fourth embodiment differs from the first to third embodiment in that a catch 62 protrudes from the second wall 30 into the receiving section 26. The catch 62 comprises a half-circular end which is designed to snap into the through-hole 52 of the locking element 48 to provisionally secure the locking element 48 in the receiving section 26. For this purpose the catch 62 is spring-loaded (spring not shown).

Figure 10:
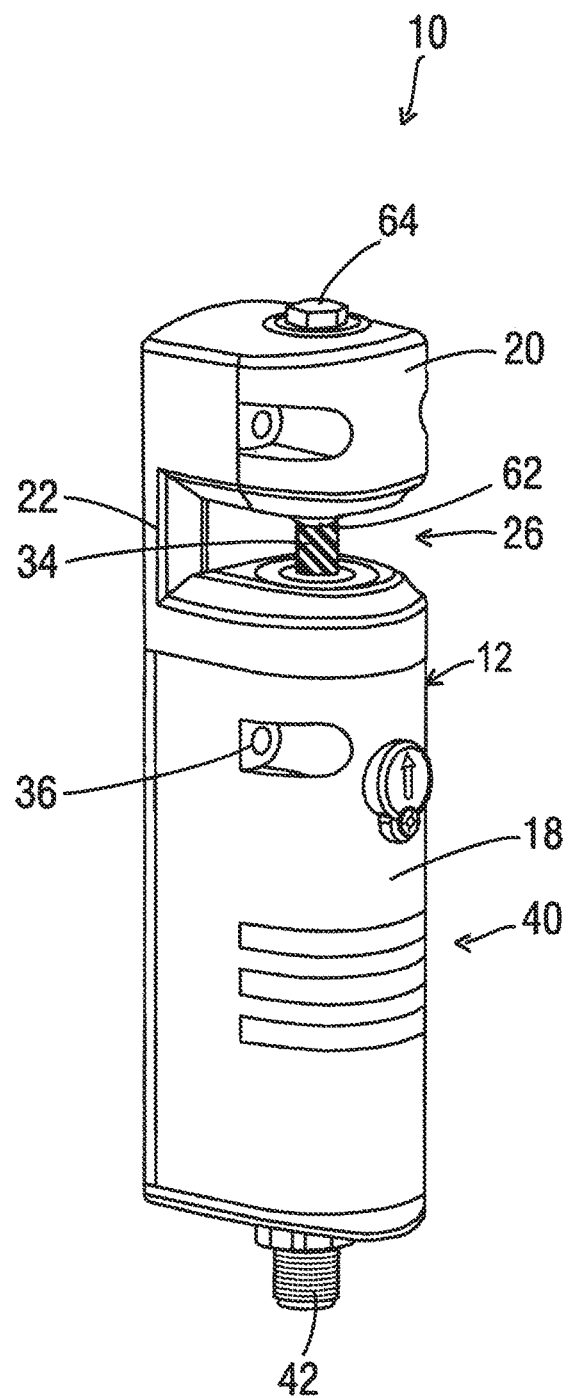
FIG. 10 shows a fifth embodiment of a safety locking device in a perspective view.

To "completely" secure the locking element 48 in the receiving section 26, the latch 34 can protrude from the first wall 28 into the receiving section 26, wherein the latch 34 protrudes into the through-hole 52. The latch 34 can abut against the catch 62, as is shown in FIG. 10. The latch 34 of FIG. 10 comprises a cylindrical form having a flat end face, or can comprise a concave end face which is adapted to the form of the catch 62 (not shown).

FIG. 10 shows a fifth embodiment of a safety locking device 10, wherein only the stationary part 12 is depicted. The stationary part 12 of the fifth embodiment differs from the fourth embodiment in that an adjusting screw 64 extends from the counter piece 20 such that the counter piece 20 is arranged between the adjusting screw 64 and the part of the catch 62 which protrudes into the receiving section 26.

The adjusting screw 64 is adapted to adjust the strength of the spring-load of the catch 62. Thereby, the strength that is necessary to remove the provisionally secured locking element 48 from the receiving section 26 can be varied.

LIST OF REFERENCE SIGNS 10 safety locking device
12 stationary part
14 movable part
16 housing
18 main piece
20 counter piece
22 connection section
24 opening
26 receiving section
28 first wall
30 second wall
32 chamfered edge
34 latch
36 mounting holes
38 manual release
40 status-LED
42 electrical connector
44 holding element
46 screw
48 locking element
50 elastic element
52 through-hole
54 C-shape
56 trench
58 guiding wall
60 slotted hole
62 catch
64 adjusting screw
I insertion direction
L locking direction

The invention claimed is:
1. A safety locking device for interlocking a safety door, the safety locking device comprising:

a movable part designed for being fastened to a moving part of the safety door, the movable part having a locking element; and a stationary part designed for being fastened to a non-moving part of the safety door, wherein the stationary part comprises a receiving section, the receiving section comprising an opening for the reception of the locking element, wherein the locking element can be inserted into the receiving section from different insertion directions, the stationary part further comprises a latch, the latch being selectively movable from a locking position into a release position, wherein the locking element cannot be withdrawn from the receiving section when the latch is in the locking position and wherein the locking element can be withdrawn from the receiving section when the latch is in the release position, and wherein the locking element is secured in the locking position aligned in one of a plurality of different locking directions and Wherein the different locking directions comprise directions which together form a continuous angular range of at least 90°.

2. The safety locking device of claim 1, wherein the different locking directions comprise directions which together form a continuous angular range of at least 180°.

3. The safety locking device of claim 1, wherein the different insertion directions comprise directions which together form a continuous angular range of one of at least 90° and at least 180°.

4. The safety locking device of claim 1, wherein the receiving section and/or the opening are formed between a main piece of the stationary part and a counter piece of the stationary part.

5. The safety locking device of claim 4, wherein the receiving section is bordered by two parallel walls, a first wall being of the main piece and a second wall being of the counter piece.

6. The safety locking device of claim 1, wherein the opening comprises a continuous angular range around the latch of at least 180°.

7. The safety locking device of claim 1, wherein the latch is rotationally symmetric.

8. The safety locking device of claim 7, wherein an end region of the latch is spherical or ball-shaped.

9. The safety locking device of claim 1, wherein in the release position, the latch protrudes into the receiving section.

10. The safety locking device of claim 1, wherein in the release position, the latch is spring-loaded.

11. The safety locking device of claim 1, wherein the stationary part at least partly has a half-circular cross section in a top view.

12. The safety locking device of claim 1, wherein the locking element protrudes from a holding element of the movable part, the holding element being adapted to be fastened to the moving part of the safety door.

13. The safety locking device of claim 12, wherein the locking element is tongue-shaped.

14. The safety locking device of claim 1, wherein the locking element comprises a through-hole, wherein in the locking position the latch at least partly protrudes into or through the through-hole.

15. The safety locking device of claim 1, wherein the stationary part comprises a catch which is adapted to provisionally secure the locking element when the locking element is in the receiving section.

16. The safety locking device of claim 15, wherein the catch is spring-loaded.

17. The safety locking device of claim 16, wherein the force exerted on the catch by a spring is adjustable.

18. The safety locking device of claim 1, wherein the locking element comprises guiding means for interaction with the latch.

19. The safety locking device of claim 18, wherein the guiding means are formed by east one of funnel-like trenches and C-shaped outer walls.

20. The safety locking device of claim 1, wherein the locking element comprises a transponder, and the stationary part comprises a reading device for detecting the transponder.

21. A safety locking system, comprising:

a safety locking device for interlocking a safety door, the safety locking device having a movable part having a locking element, and a stationary part designed for being fastened to a non-moving part of the safety door, wherein the stationary part comprises a receiving section, the receiving section comprising an opening for the reception of the locking element, wherein the locking element can be inserted into the receiving section from different insertion directions, wherein the stationary part further comprises a latch, the latch being selectively movable from a locking position into a release position, wherein the locking element cannot be withdrawn from the receiving section when the latch is in the locking position and wherein the locking element can be withdrawn from the receiving section when the latch is in the release position, and wherein the locking element is secured in the locking position aligned in one of a plurality of different locking directions and wherein the different locking directions comprise directions which together form a continuous angular range of at least 90°, wherein the safety door has a movable wing and a stationary frame, wherein the stationary part of the safety locking device is fastened to the stationary frame and the movable part of the safety locking device is fastened to the moveable wing of the safety door, and wherein the locking element of the movable part is inserted into the receiving section of the stationary part when the safety door is closed.

22. The safety locking device of claim 1, further comprising an electric actuator for selectively moving the latch.

* * * * *